(12) United States Patent
Sams

(10) Patent No.: US 8,561,038 B1
(45) Date of Patent: Oct. 15, 2013

(54) HIGH PERFORMANCE EXECUTION ENVIRONMENT

(75) Inventor: R. Jason Sams, San Jose, CA (US)

(73) Assignee: Google Inc., Mountain View, CA (US)

(*) Notice: Subject to any disclaimer, the term of this patent is extended or adjusted under 35 U.S.C. 154(b) by 807 days.

(21) Appl. No.: 12/650,803

(22) Filed: Dec. 31, 2009

(51) Int. Cl.
*G06F 9/45* (2006.01)

(52) U.S. Cl.
USPC ............................ 717/140; 717/107; 717/147

(58) Field of Classification Search
USPC .................. 717/105, 115, 118, 107, 140, 147
See application file for complete search history.

(56) References Cited

U.S. PATENT DOCUMENTS

| | | | |
|---|---|---|---|
| 7,065,752 B2 * | 6/2006 | Willard .......................... | 717/140 |
| 7,230,562 B1 * | 6/2007 | Provis et al. .................. | 341/176 |
| 7,275,243 B2 * | 9/2007 | Gibbons et al. ............... | 717/159 |
| 7,286,076 B1 * | 10/2007 | Provis et al. .................. | 341/173 |
| 7,339,513 B1 * | 3/2008 | Provis et al. .................. | 341/173 |
| 7,362,256 B1 * | 4/2008 | Provis et al. .................. | 341/173 |
| 7,436,345 B1 * | 10/2008 | Provis et al. .................. | 341/173 |
| 2008/0016491 A1 * | 1/2008 | Doepke ......................... | 717/104 |
| 2009/0231332 A1 * | 9/2009 | Woo et al. ..................... | 345/419 |

OTHER PUBLICATIONS

Jepsen et al., "An ATM API for Java", 1998.*

* cited by examiner

*Primary Examiner* — Phillip H Nguyen
(74) *Attorney, Agent, or Firm* — Fish & Richardson P.C.

(57) ABSTRACT

The subject matter of this specification can be implemented in, among other things, a computer-implemented method for accessing a native application programming interface (API) of a computing device including receiving on the computing device one or more control objects from a first application written in a device-independent programming language. The control objects define a context for accessing the native API and the control objects include at least one control script. The method further includes compiling the control script on the computing device into a second application that is native to the operating system of the computing device. The method further includes executing the second application on the computing device. The executed second application accesses the native API of the computing device to generate an output through a hardware interface of the computing device based on the context.

20 Claims, 5 Drawing Sheets

HIGH PERFORMANCE EXECUTION ENVIRONMENT

BACKGROUND

Mobile computing devices, such as smartphones, are becoming more and more popular. As mobile devices become more and more popular, users of the devices demand more and more functionality from them. In some cases, users expect mobile devices to replace functionality once performed by desktop or laptop computing devices. This additional functionality can test the bounds of the hardware resources available on the mobile computing device, such as processor or display screen performance (e.g., resolution, refresh rate, or responsiveness). Generally, such hardware is not as powerful as that in desktop or laptop computers because of size, weight, and battery life issues.

Software for mobile devices frequently uses one of two approaches when rendering drawing objects on a display screen. These approaches generally access an application programming interface, such as OpenGL, for rendering drawing objects. The drawing application programming interface (API) for such systems is generally written in a native programming language, such as the C programming language. This can improve drawing performance on the mobile device over non-native programming languages and/or applications. In some cases, software code written to access the native drawing API is also written in the native programming language. The native software code sends drawing commands to the native drawing API to update drawing objects on the display screen of the mobile device. This native software code is generally specific to a particular type of mobile device, and separate native software code needs to be written, and/or compiled from the software code, for other mobile devices.

In other cases, software code can be written in a non-native programming language, such as a high-level, device-independent programming language (e.g., the Java programming language). The device-independent software code then accesses a wrapper for the native drawing API, such as the Java Native Interface (JNI). The wrapper can be written in the high-level, device-independent programming language. The wrapper generally includes an API that provides access to the features of the native drawing API. The device-independent software code then sends individual drawing commands to the wrapper API which are then passed to the native drawing API.

SUMMARY

In general, this document describes a high performance execution environment that accesses native APIs and/or hardware. In some cases, the execution environment is implemented in a mobile computing device or other computing device that has limited processing resources. An application written in a high-level, device-independent programming language passes control objects to the execution environment. The control objects include one or more control scripts. The execution environment compiles the control scripts into a native application and executes the native application. The native application then accesses the native APIs, for example, to render drawing objects on a display screen. In some implementations, the native application can communicate with the high-level application while the native application is being executed. In some implementations, the high performance execution environment is provided by the RENDERSCRIPT API of the ANDROID ("Android" is a trademark of Google Inc. of Mt. View, Calif.) operating system (OS) available from the OPEN HANDSET ALLIANCE.

In a first aspect, a computer-implemented method for accessing a native application programming interface (API) of a computing device includes receiving on the computing device one or more control objects from a first application written in a device-independent programming language. The control objects define a context for accessing the native API and the control objects include at least one control script. The method further includes compiling the control script on the computing device into a second application that is native to the operating system of the computing device. The method further includes executing the second application on the computing device. The executed second application accesses the native API of the computing device to generate an output through a hardware interface of the computing device based on the context.

Implementations can include any, all, or none of the following features. The second application can be compiled as one or more threads that are separate from the first application. The second application can be compiled as a process that is separate from the first application. The first application can be executed on a first processor of the computing device, and the second application can be executed on a second processor of the computing device that is separate from the first processor. The first processor can include a central processing unit and the second processor can include a graphics processing unit. The first application does not directly access the native API. The native API can include a native rendering API, the hardware interface can include a display screen, and the second application accesses the native rendering API to render drawing objects on the display screen. The method can include receiving one or more updates to the context from the first application and wherein, in response to receiving the updates to the context, the executed second application accesses the native API of the computing device to generate an output through the hardware interface of the computing device based on the updated context.

In a second aspect, a computer program product, encoded on a computer-readable medium, operable to cause one or more processors to perform operations for accessing a native application programming interface (API) of a computing device includes receiving on the computing device one or more control objects from a first application written in a device-independent programming language. The control objects define a context for accessing the native API and the control objects include at least one control script. The operations further include compiling the control script on the computing device into a second application that is native to the operating system of the computing device. The operations further include executing the second application on the computing device. The executed second application accesses the native API of the computing device to generate an output through a hardware interface of the computing device based on the context.

Implementations can include any, all, or none of the following features. The second application can be compiled as one or more threads that are separate from the first application. The second application can be compiled as a process that is separate from the first application. The first application can be executed on a first processor of the computing device, and the second application can be executed on a second processor of the computing device that is separate from the first processor. The first processor can include a central processing unit and the second processor can include a graphics processing unit. The first application does not directly access the native API. The native API can include a native rendering API, the hardware interface can include a display screen, and the second application accesses the native rendering API to render drawing objects on the display screen. The operations can include receiving one or more updates to the context from the first application and wherein, in response to receiving the updates to the context, the executed second application accesses the native API of the computing device to generate an output through the hardware interface of the computing device based on the updated context.

In a third aspect, a computing device includes a hardware interface that outputs information to a user of the computing device. The device further includes a memory storing instructions including a native application programming interface (API) configurable to make an output through the hardware interface of the computing device, a compiler configured to compile control scripts into applications that are native to an operating system of the computing device, and a first application written in a device-independent programming language that when executed provides one or more control objects to the compiler. The control objects define a context for accessing the native API and the control objects include at least one control script. The device further includes one or more processors that execute the first application and as a result execute a second application compiled from the control script by the compiler. The executed second application accesses the native API to generate the output through the hardware interface of the computing device. The output is based on the context.

Implementations can include any, all, or none of the following features. The hardware interface can include a display device, the native API can include a native rendering API, and the output can include one or more drawing objects rendered on the display device.

In a fourth aspect, a computing device includes a hardware interface that outputs information to a user of the computing device. The device further includes a central processing unit. The device further includes a graphics processing unit. The device further includes means for executing code provided from the central processing unit to the graphics processing unit by passing one or more control objects, including at least one control script, from the central processing unit to the graphics processing unit.

The systems and techniques described here may provide one or more of the following advantages in certain implementations. First, using such systems, programmers can generate software code and applications and have the same code execute on multiple different types of devices. Second, the code can provide high performance rendering of drawing objects in a mobile device. Third, a system can provide high performance applications by offloading the heavy lifting of interfacing with a native graphics API, while retaining full application control. Fourth, a system can prevent stuttering or lagging display response to user interaction in a mobile computing device. Fifth, a system can maintain vertical synchronization level performance, which may allow a display frame buffer to be filled before the display frame buffer is transmitted to the display. Sixth, a system can provide for refreshing a display screen of a mobile computing device by the compiled script without a call back to the control application. In this manner, such a system may provide for improved graphical performance while allowing common code to be used across multiple device types, which may lead to better user experiences and more complete adoption of a platform by software developers.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for accessing a native application programming interface (API) of a computing device. In some implementations, the computing device is a device with limited processing resources, such as a mobile computing device. In one example discussed here, an application that has been written using a high-level, device-independent programming language, such as Java, passes control objects to an execution environment. The control objects include state information (e.g., a context) that define an initial state of the information provided to the native API (e.g., an initial state of a drawing or rendering for output on a display screen). The control objects also include one or more scripts. The execution environment on the mobile computing device initiates a compiler that compiles the scripts into a native application. The native application then accesses the native API in lieu of the high-level application accessing the native API. The native application uses the actions from the scripts and the initial state of the information to control the output of the information to the hardware interface, such as an output of drawing objects on a display screen. In some implementations, the execution environment initiates compilation of the scripts at run-time when the high-level application passes the control objects to the execution environment for execution.

Figure 1:
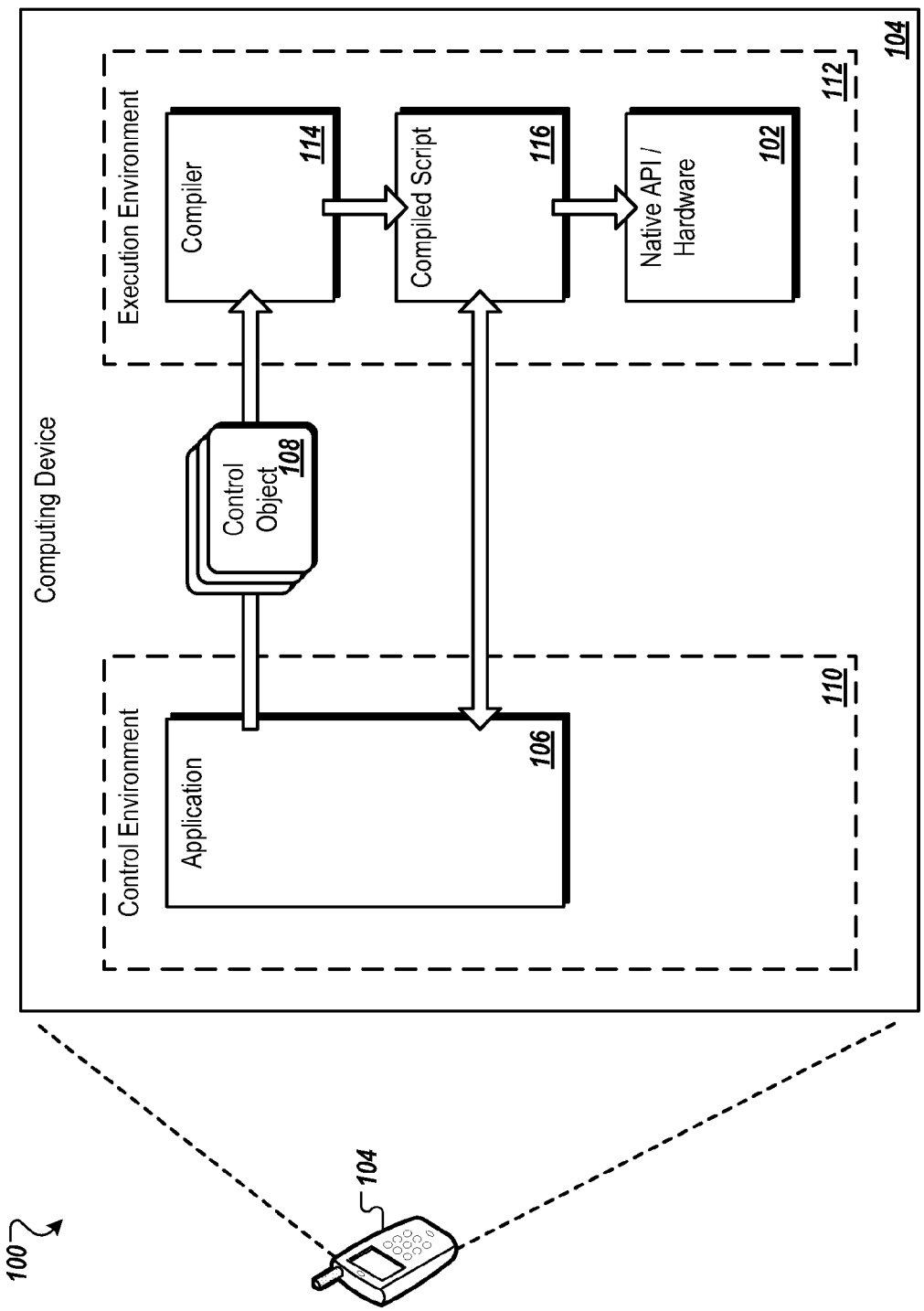
FIG. 1 is a schematic diagram that shows an example of a system for accessing a native application programming interface (API) of a computing device.

FIG. 1 is a schematic diagram that shows an example of a system 100 for accessing a native API 102 of a computing device 104. In particular, the system 100 allows an application 106 to initiate access of the native API 102 by passing one or more control objects 108 from a control environment 110 to an execution environment 112.

The computing device 104 executes or runs the application 106. The application 106 is written in a high-level, device-independent programming language, such as Java. In some implementations, the computing device 104, or another device, pre-compiles the application 106 at some time prior to a request to run the application 106. Alternatively, the computing device 104 may compile the application 106 at run-time, or may use some combination of pre-compilation and compilation at run-time.

The application 106 accesses an API of the control environment 110 either at run-time, compile time, or both. In some implementations, the API of the control environment 110 is written in the high-level, device-independent programming language of the application 106. Alternatively, the API of the control environment 110 can be written in another programming language that is otherwise callable by the application 106. The API of the control environment 110 passes the control objects 108 from the application 106 to the execution environment 112.

The control objects 108 include at least one script. In some implementations, the script is written in the native programming language used by the native API 102. The script may alternatively be written in another programming language, such as an intermediate programming language that can be translated into the native programming language during compilation. The execution environment 112 then provides the script to a compiler 114 within the computing device 104. The compiler 114 compiles the script into a compiled script 116. The compiled script 116 is a native application and has direct access to the native API 102. In some implementations, compiling the script at the computing device 104 provides portability of the software code in the script.

The compiled script 116 uses the state information in the control objects 108 along with the processing specified in the script to access the native API 102, and consequently a hardware interface, of the computing device. In some implementations, the control environment 110 passes the state information in the control objects 108 to the native API 102 when the control environment 110 passes the control objects 108 to the execution environment 112. In some implementations, the control environment 110 passes the state information in the control objects 108 to the native API 102 when the control objects 108 are used by the compiled script 116.

The compiled script 116 can continue to update the output to the hardware interface, through the native API 102, as the compiled script 116 receives updates to the state information. For example, a user may make an input to the computing device 104 to initiate the application 106. The application 106 may have a graphical user interface (GUI) that allows the user to interact with the application 106. The application 106 may then initiate the GUI by passing the control objects 108 to the execution environment 112. The compiler 114 of the execution environment 112 may then compile the script from the control objects 108 into the compiled script 116. The execution environment 112 runs the compiled script 116. The compiled script 116 directly accesses the native API 102 to draw the GUI, and can receive updates to the state of the GUI in the control objects 108, for example, from the application 106 or another application. The compiled script 116 then makes corresponding calls to the native API 102 to update the display of the GUI on the display screen.

In some implementations, the computing device 104 is a mobile computing device, such as a smartphone or other computing device with limited resources. For example, the computing device 104 may have limited space available or energy available for a central processing unit (CPU) or a graphics processing unit (GPU). The limitations on size and energy consumption for the CPU and/or GPU may accordingly reduce the processing capability of the CPU and/or GPU. The separation of direct access to the native API 102 from the application 106 can, in some implementations, reduce the amount of processing needed for accessing certain hardware interfaces, such as a display device, light emitting diodes (LEDs), a speaker, a hardware keyboard or buttons, or a vibration device. In the case of a display device, the state of the objects to be drawn or rendered on the display device can be represented by one or more of the control objects 108 while the instructions for rendering the drawing objects are included in the script. In certain examples, the control environment may execute on a CPU, while the execution environment may execute on a GPU, so that passing of control objects and other messages occurs between the two processors. Also, such allocation of responsibilities may permit general code to be resident on the general CPU, and the GPU to compile the scripts or other information in a manner that is appropriate to the hardware of the computing device 104.

Figure 2:
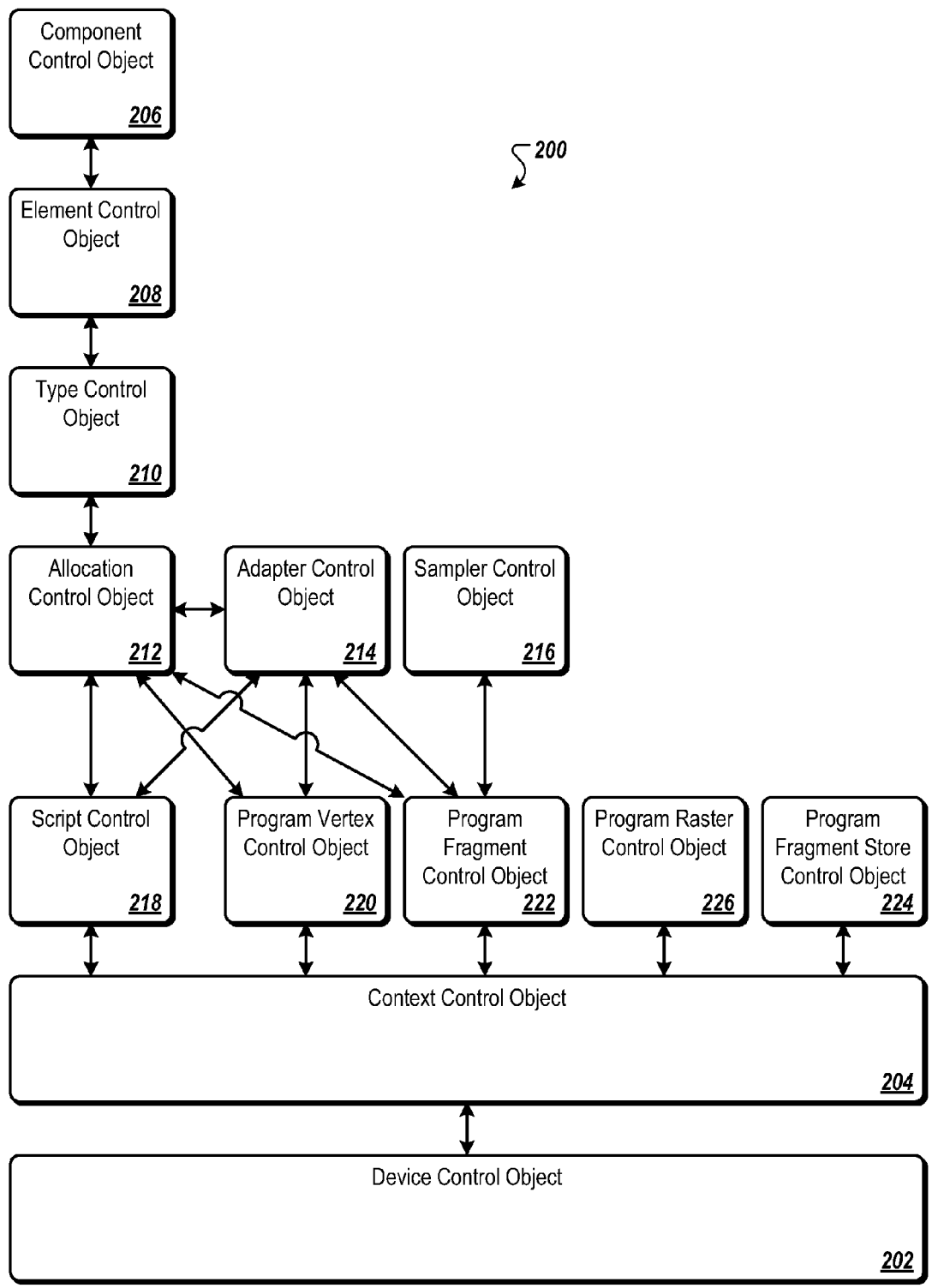
FIG. 2 is a block diagram that shows an example of an execution environment that includes multiple control objects for accessing a native application programming interface (API) of a computing device.

FIG. 2 is a block diagram that shows an example of multiple control objects 200 provided by an API of a control environment, such as the control environment 110. The control objects 200, when passed to an execution environment, such as the execution environment 112, provide access to a native rendering API of a computing device. A parent application written in a high-level language creates or instantiates the control objects 200 using an API of the control environment. The control API is written in or is otherwise accessible by the high-level language of the parent application. One or more scripts in the control objects 200 include instructions for accessing the native rendering API based on the state information in the control objects 200.

In general, a parent application calls a construction state machine in the control API to create an instance of a particular control object, such as any one of the control objects 200. The parent application and/or the control API makes a series of one or more function or procedure calls to build up the control object. For example, the parent application can start by calling a "Begin" procedure that resets the internal object creation buffer to a default state. In another example, the control API can use temporary builder objects to contain the internal creation state. In some implementations, the temporary builder objects allow the parent application to construct multiple objects concurrently. The parent application then makes one or more calls that modify the default state to a state desired by the parent application. Once the control object is in the desired state, the parent application and/or the control API calls a "Create" procedure that constructs the control object from this desired state and provides the control object to the parent application. Multiple such control objects may be created in this manner.

The control objects are reference counted internally by the control API. In particular, when the control API creates an initial control object, a handle to the initial control object is created with an associated reference count of one. Each time the control API binds the initial control object to another control object, the control API increments the reference count associated with the initial control object.

The control API decrements the reference count of the initial control object when the control API unbinds the other control object from the initial control object. This allows the control API to create a control object, bind it to another object, and then release the user reference (e.g., the reference from the calling or parent application). The control API destroys the initial control object once it unbinds the initial control object from the last of the other control objects that reference the initial control object. This may occur, for example, during a destruction procedure for the other control objects. In some implementations, the parent application can use the control API to call the destruction procedure for a particular control object.

The example of the control objects 200 shown in FIG. 2 includes a number of control objects that divide up the operations associated with accessing the native rendering API, such as a device control object 202. The device control object 202 represents a combination of hardware and software that implements the control API. In some implementations, the control objects 200 can include multiple device control objects. For example, where a computer device includes more than one display screen there can be a device control object for each display screen. In another example, where a computer device includes more than one native API for a display screen there can be a device control object for each of the native APIs. In some implementations, the device control object 202 allows calling applications, such as the application 106, to query the basic parameters of the device control object 202, such as the versions of the control API that are supported. In some implementations, the parent application uses the control API to create the device control object 202 first and the device control object 202 is used, in turn, to create other control objects, such as a context control object 204.

The context control object 204 contains the basic state that represents the currently active rendering pipeline. The context control object 204 has bind points for various programs or other control objects that form the graphics pipeline. The context control object 204 represents a version of the control API that is exposed by a particular computing device, such as a smartphone. In some implementations, a calling application, such as the application 106, may have more than one context control object.

In some implementations, a computing device can support multiple revisions of the control API. The control API call that creates the context control object 204 in such a situation takes a version to indicate which revisions a calling application, such as the application 106, requires. In some implementations, this allows for incompatible changes to be made to a future revision of the control API without breaking existing applications that call functions from the control API.

Once the context control object 204 is created, it is bound to a particular native API and hardware combination as specified by the device control object 202. In some implementations, the application 106 can release the context control object 204 from the device control object 202 and re-bind it to another device control object. In some implementations, destroying the context control object 204 also destroys any unshared control objects that were created by the context control object 204. For example, the context control object 204 may be used to create other sub control objects that describe the drawings or images to be rendered on the displays screen, such as a component control object 206.

The component control object 206 is a basic object that represents the smallest element of data in the drawing system. For example a pixel in the red-green-blue (RGB) color model would have three component control objects. Each of those component control objects would contain three pieces of state information. The first is what the particular component control object represents, such as a red, green, or blue color value or other drawing information, such as an alpha value. In addition, drawing information for three dimensional model data can include positional information (e.g., x, y, and z coordinates), normal information (e.g., nx, ny, and nz coordinates), and texture coordinates (e.g., s and t). The component control object 206 describes the properties of what is to be rendered on the display device. The information in the component control object 206 can be used to create meshes of triangles, lines, or points. The second piece of state information is the number of bits used to store the component control object 206. The third piece of state information is the storage format, such as decimal floating point number, normalized, signed integer, or unsigned integer. Other pieces of drawing information may also be stored with respect to particular component control objects, as appropriate.

The control objects 200 also include an element control object 208 that groups one or more component control objects. An element control object is an object that represents the contents of one location in a data structure. Typically this one location is one pixel, one vertex, one texel, or one user defined drawing object. For example, an RGB pixel would have three components that describe the layout of the data. For example, an element control object can include three component control objects for the RGB color system (e.g., R8 G8 B8). In another example, an element control object can include spatial information, such as normal coordinates (e.g., nx, ny, and nz coordinates) or other coordinates (e.g., x, y, and z coordinates).

The control API provides operations for managing element control objects. For example, the control API can include a procedure for clearing the internal state machine for building element control objects. The control API can include a procedure for adding an element control object to an internal buffer by creating the element control object from a type that is selected from a predefined list of element control object types, such as a pixel, vertex, or texel. The control API can include a procedure for adding a component or element control object to the internal buffer that is defined by the calling application. The control API can include a procedure for returning a reference to one of the predefined element control object types. The control API can include a procedure for destroying or releasing a reference to an element control object.

The element control object 208 can be grouped with one or more other element control objects by a type control object 210. The type control object 210 defines a collection of element control objects that are assigned a dimensional structure. The shape of the structure can be defined by the calling application. For example, the type control object 210 may define a square with component and element control objects for RGB color values (e.g., R8 G8 B8), a height value, and a width value.

The type control object 210 can have one or more of several pre-defined dimensions or parameters to which the calling application may assign values. Typically only a subset of the dimensions are used. For example, the type control object 210 can include an X dimension. The X dimension is the lowest order structural dimension. The type control object 210 can also include a Y dimension, which if present, implies the particular type control object can be viewed as a two-dimensional surface. For example, an image can be a two dimensional surface. If the type control object 210 includes a Y dimension, then the type control object 210 can also include a Z dimension, which if it is present, indicates that the particular type control object can be represented as a three-dimensional volume. If a Z dimension is not specified, the type control object 210 can include a faces dimension. If the faces dimension is set to "true," then the structure represented by the type control object 210 is a cubemap. The type control object 210 can include a mips dimension with a value of "true" or "false." If the mips dimension is true, then the type control object 210 includes one or more mipmaps for the x, y, z, faces structure. The type control object 210 can also include an array dimension. The array dimension acts similar to arrays in the ANSI C programming language. The array dimension allows the calling application and/or one or more control scripts to select between multiple identical substructures.

Storage for the type control object 210 is provided by an allocation control object 212. The allocation control object 212 stores a particular type control object and the elements of the type control object in a particular memory allocation. For example, the allocation control object 212 can store textures, vertex buffers, index data, and/or usage hints, such as OpenGL vertex buffer object (VBO) hints.

The control API can provide a procedure for creating an allocation control object from a particular type control object, and for creating an allocation control object from a particular number of an element control objects, such as by creating a one-dimensional array of the element control object. The control API can provide a procedure for loading an image file, constructing a type control object from the image file, and then creating an allocation control object from the constructed type control object. The control API can also provide a procedure for promoting an allocation control object to texture memory, and for destroying or releasing an allocation control object that is specified by a calling application and/or script.

The allocation control object 212 can be simplified by an adapter control object 214. The adapter control object 214 presents an allocation control object in a form that is accessible as a simpler structure. The adapter control object 214 takes inputs including a reference to an allocation control object. The adapter control object 214 holds zero or more of the dimensions of the allocation control object as constants and presents the remaining dimensions as parameters to accessor functions. The type of the adapter control object 214 (e.g., one dimensional, two dimensional, etc.) determines how many dimensions will be held constant. Adapter control objects allow the writing of APIs or functions that understand a specific set of dimensions. For example, in regard to an image filter, the image filter can be fed two-dimensional filter levels of a mipmap, faces of a cubemap, or slices of a voxel, by changing the constant dimensions on the adapter control object 214.

The adapter control object 214 is in essence a conversion container that adapts an allocation control object, such as the allocation control object 212, to present it as a lower dimension object. For example, a mipmap adapter can present an allocation control object that has two-dimensional images and mipmap levels as simply a two-dimensional object. In some implementations, an adapter control object can be used interchangeably with an allocation control object. The adapter control object 214 receives its data from an allocation control object to which the adapter control object 214 is bound. In some implementations, no copy of data from the bound allocation control object to the adapter control object 214 is made.

The control API can include functions for creating and destroying adapter control objects, and a function for setting a dimension to a constant that is not in the basic dimensionality of the adapter control object 214. This selects a part of a larger type control object for access. For example, a two-dimensional adapter control object may set mipmap level to four to select the two-dimensional image for mipmap level four.

The allocation control object 212, in its original or simplified form, is used by a sampler control object 216 to represent the drawing information as a texture sample. The sampler control object 216 contains the state that is used to turn a texture source and coordinate into a sample. The sampler control object 216 takes as input an allocation control object and a definition of how the allocation control object is to be accessed as a texture and defines the wrap modes, filter modes, and other texture properties that are not part of the allocation control object itself. The control API includes functions for binding the sampler control object 216 to a particular allocation control object and for setting the modes of the sampler control object 216.

The drawing system state defined by the previously described control objects can be manipulated by operations defined in a script control object 218. The script control object 218 includes a portion of embeddable code that is received in source form from an application, such as the application 106, and then compiled or interpreted, for example by the execution environment 112 and the compiler 114. In general, the script control object 218 contains a list of commands that are executed when the compiled script is run by the execution environment. In some implementations, the compiler compiles the script control object 218 into a process that is separate from the other compiled scripts. Alternatively, the compiled script may be in the same process as the other compiled scripts, but in its own thread. In some implementations, the compiled script includes more than one thread. In some implementations, the compiled script is executed on a processor other than the processor of the calling application and/or other compiled scripts.

In some implementations, the script control object 218 runs in a well-defined environment, such as is defined by one or more of the following features. The script control object 218 may have access to only a short list of functions, such as a subset of functions from the control API. For example, the subset may exclude the control API functions that construct the control objects 200. Other features of the well-defined environment may include any of a small fixed size memory stack for the compiled scripts, preventing directly shared data between compiled scripts, preventing memory allocation, and preventing the calling of other compiled scripts. However, in some implementations, the well-defined environment can provide functions for changing the state of the context control object 204 and/or running a compiled script concurrently with one or more other compiled scripts.

In some implementations, the control API provides a function the parent application can call to identify a script control object as a "root" script control object. A root script control object is special in that it is designed to be attached to a surface. For example, a root script for the context control object 204 is given the responsibility of redrawing the display each time the root script is called. As such, the initial state of the context control object 204 will be well defined, and the leftover state upon exiting the root script will be assumed to be lost and not carried over to the next invocation of the root script.

The script control object 218 can access local and shared data stores. Each script control object has an implied allocation of temporary variables and may also have one or more constants buffers. These buffers are allocation control objects that are attached to the script control objects. By default, the attachments are read only, but can be made writable, so that a script control object can produce a persistent run-to-run state.

Data can be passed to the script control object 218 in multiple ways. For example, one or more allocation control objects can be bound to the script control object 218. In some implementations, the type of the allocation control objects is defined at the time the script control object 218 is created. In addition or alternatively, a binding may be changed by the parent (e.g., the calling application or control object), and a bound allocation control object may be read only, write only, or read and write.

In another example, data can be passed to the script control object 218 through one or more input parameters. In some implementations, these parameters passed into the function in the script control object 218 allow different data to be passed to different instances of the script control object 218. For example, ten scripts can be used to draw ten different icons. In such a case, each script can receive a different icon id and position that specify what icon is displayed and where the icon is displayed.

In some implementations, the script control object 218 inherits a "default" state that is the state of the context control object 204 when the compiled script is first executed or instanced. State changes made by a compiled script during execution of the compiled script can be lost at the end of the execution, and in some implementations, this minimizes side effects produced by the compiled scripts and allows the concurrent execution of many scripts at once.

The control objects 200 can include objects that mirror specific drawing operations provided by the native rendering API. For example, the control objects 200 include a vertex control object 220 and a fragment control object 222 that are similar to vertex and fragment objects in the OpenGL rendering API. In addition, a fragment store control object 224 can encapsulate the state (and, in some implementations, programmable operations) that occur when the fragment control object 222 is written to a buffer. A raster control object 226 contains the state that is used to rasterize primitives from the vertex control object 220, and provides the rasterized primitives to the fragment control object 222. For example, the rasterized primitives can include points, lines, and triangles.

In this manner, the control objects 200 provide a set of objects for storing the state of the drawings or images to be rendered on the display screen. The control objects 200 also provide a representation of operations that can be performed from the native rendering API for manipulating the drawings. Further, the control object 200 include the script control object 218 that when compiled and executed, provides direct access to those operations from the native rendering API to update the display screen with the rendered drawings and images.

Figure 3:
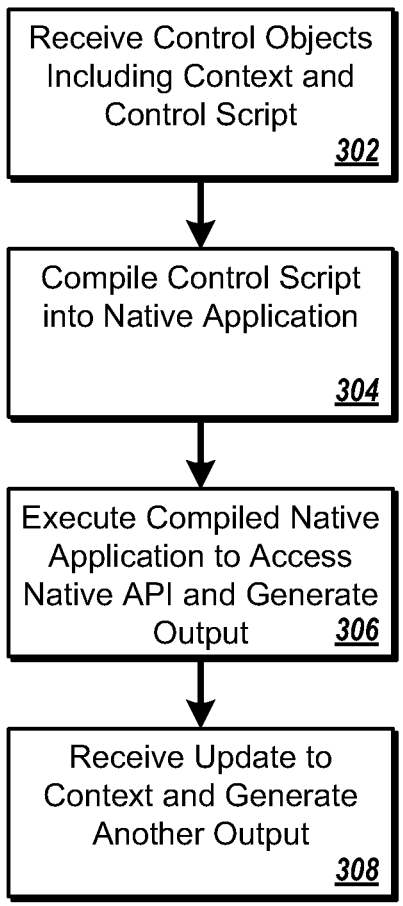
FIG. 3 is a flow chart that shows an example of a process for accessing a native application programming interface (API) of a computing device.

FIG. 3 is a flow chart that shows an example of a process 300 for accessing a native API of a computing device. In general, the process involves processing of received control objects and executing compiled script items contained in the objects. The process 300 can be performed, for example, by a system such as the system 100 and the control objects 200. For clarity of presentation, the description that follows uses the system 100 and the control objects 200 as the basis of examples for describing the process 300. However, another system, or combination of systems, may be used to perform the process 300.

The process 300 begins with receiving (302) one or more control objects from a first application that is written in a device-independent programming language and is executed on a particular computing device. The control objects define a context for accessing a native API and include at least one control script. For example, the application 106 can pass the control objects 108 to the execution environment 112 to request a drawing rendering operation for a GUI of the application 106. The device-independent programming language allows the first application to be used with multiple devices that have different types of hardware.

The process 300 then compiles (304) the control script into a second application that is native to an operating system of the computing device. For example, the computing device 104 in FIG. 1 includes the compiler 114 that compiles the control script from the control objects 108 into the compiled script 116. In some implementations, the computing device 104 can be a smartphone or other mobile device that runs a mobile device operating system, such as the ANDROID operating system. In this example, the compiler 114 at the computing device 104 compiles the control script into a format that can be executed natively by the ANDROID operating system.

The process 300 then executes (306) the second application. The executed second application accesses the native API of the computing device to generate an output through a hardware interface of the computing device. The output generated by the second application is based on the context. For example, the execution environment 112 executes the compiled script 116, which includes operations that are capable of interfacing with the native API 102 to send an output through a hardware interface, such as a display screen or audio output.

Optionally, the process 300 can receive (308) one or more updates to the context from the first application. In response to receiving the one or more updates, the executed second application accesses the native API of the computing device to make another output through the hardware interface of the computing device based on the updated context. For example, the application 106 can send an update to the control objects 108. Accordingly, the compiled script 116, either while continuing to execute or while being executed again by the execution environment 112, can access the native API 102 again to send an updated or additional output through the hardware interface.

Thus, by this process, a computing device may coordinate control information generated by an application running on the device, and running using a device-independent language, with graphics generated on the device in coordination with the native rendering API.

Figure 4:
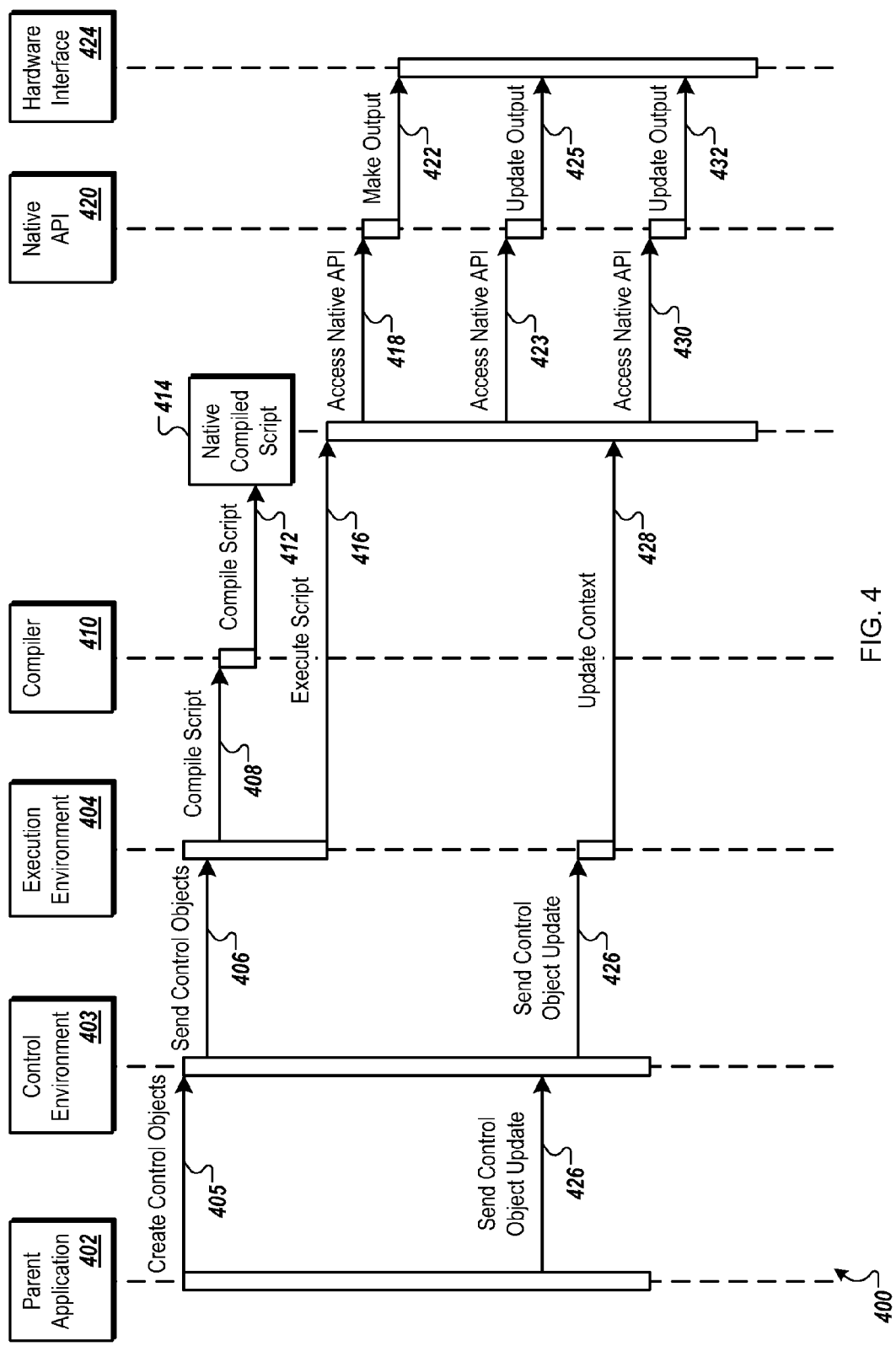
FIG. 4 is a sequence diagram that shows an example of a process for accessing a native application programming interface (API) of a computing device.

FIG. 4 is a sequence diagram that shows an example of a process 400 for accessing a native API of a computing device. In general, the process may be like that discussed with respect to FIG. 3, though more example details are provided here to indicate particular operations that may be performed by particular components of a system.

The process 400 begins with a parent application 402 calling functions from a control environment 403 to create (405) and provide (406) one or more control objects to an execution environment 404. The execution environment 404 passes (408) a script from among the control objects to a compiler 410 on the computing device. The script is written in a programming language that is capable of accessing a native API, such as a native rendering API. The compiler 410 parses the instructions in the script and compiles (412) the script into a native compiled script 414 that is capable of being executed by a processor of the computing device on which the process 400 is performed. The execution environment 404 then executes (416) the native compiled script 414 on the processor.

The native compiled script 414 calls (418) one or more functions from a native API 420 of the computing device, and the functions in turn access (422) a hardware interface 424 of the computing device, such as a display screen, LED, speaker, or vibration device, to make an output through the hardware interface 424. The native compiled script 414 can continue to run and make outputs through the hardware interface 424 without further input from the parent application 402. The native compiled script 414 bases further outputs on the state or context in the control objects. Processing carried out by the native compiled script 414 can alter the state/context and thus can subsequently result in an update to the output through the hardware interface 424.

In some implementations, the native compiled script 414 accesses (423) the native API 420 one or more times to request updates to the output or additional outputs through the hardware interface 424. The native API 420 correspondingly accesses (425) the hardware interface 424 to make the updated/additional outputs. For example, the native compiled script 414 may be in a processing loop that repeatedly draws a spinning logo on the display screen. The native compiled script 414 repeatedly accesses (423) the native API 420 to update the orientation of the spinning logo and, in response, the native API 420 repeatedly accesses (425) the hardware interface 424 to update the orientation of the logo.

In some implementations, the parent application 402 sends (426) an update to the context in the control objects to the execution environment 404. Accordingly, the execution environment 404 makes (428) the updated context available to the native compiled script 414. The native compiled script 414 processes the update to the context in the control objects and accesses (430) the native API 420 to request an update to the output or an additional output through the hardware interface 424. The native API 420 accesses (432) the hardware interface 424 to make the updated/additional output. For example, the parent application 402 can send (426) an update to the context to stop or start the spinning of the logo. In some implementations, the parent application 402 can retrieve a current state of the control objects and base its updates to the control objects on changes made to the state of the control objects by the native compiled script 414.

Figure 5:
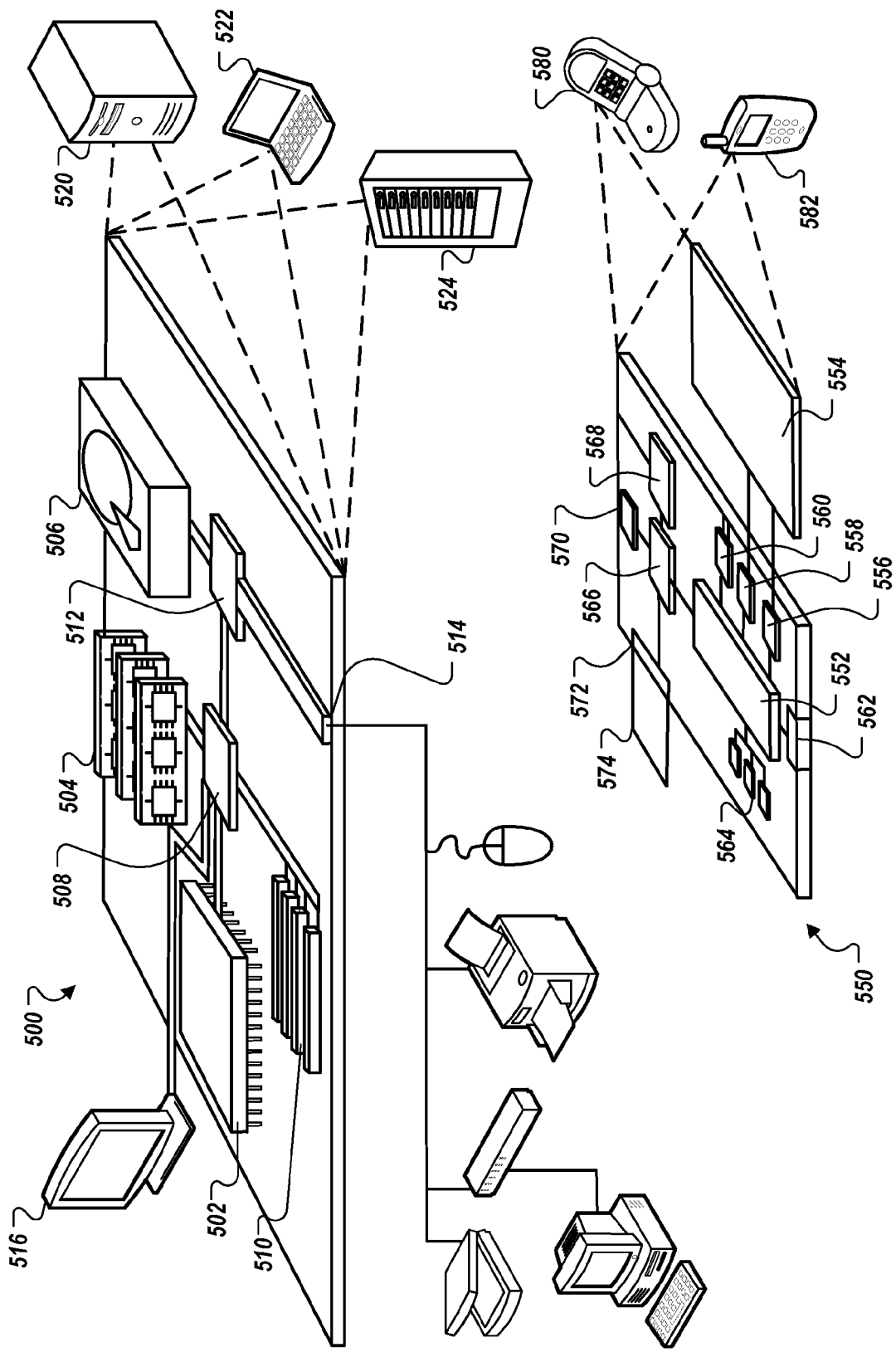
FIG. 5 shows an example of a computing device and a mobile computing device that can be used in connection with computer-implemented methods and systems described in this document.

FIG. 5 shows an example of a computing device 500 and a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for accessing a native application programming interface (API) of a computing device, the method comprising:
   executing, on a computing device, a first application written in a device-independent programming language;
   providing one or more control objects from the executing first application to a compiler on the computing device, wherein the control objects include state information that defines a context for accessing the native API and the control objects include at least one control script;
   compiling the control script on the computing device to create a second application that is native to the operating system of the computing device;
   executing the second application on the computing device, wherein the executed second application accesses the native API of the computing device to generate an output through a hardware interface of the computing device based on the context;
   receiving, by the first application, user input; and
   providing, based at least in part on the received user input and from the executing first application to the executing second application, one or more updates to cause the executing second application to accesses the native API of the computing device to generate one or more additional outputs through the hardware interface of the computing device and wherein the one or more updates include one or more updates to the state information in the control objects.

2. The method of claim 1, wherein the second application is compiled as one or more threads that are separate from the first application.

3. The method of claim 1, wherein the second application is compiled as a process that is separate from the first application.

4. The method of claim 1, wherein executing the second application comprises causing the second application to communicate with the first application executing on the computing device.

5. The method of claim 1, wherein the first application is executed on a first processor that comprises a central processing unit and the second application is executed on a second processor that comprises a graphics processing unit.

6. The method of claim 1, wherein the first application does not directly access the native API.

7. The method of claim 1, wherein the native API comprises a native rendering API, the hardware interface comprises a display screen, and the second application accesses the native rendering API to render drawing objects on the display screen.

8. The method of claim 1, further comprising receiving one or more updates to the context from the first application and wherein, in response to receiving the updates to the context, the executed second application accesses the native API of the computing device to generate an output through the hardware interface of the computing device based on the updated context.

9. A computer program product, encoded on a non-transitory computer-readable medium, operable to cause one or more processors to perform operations for accessing a native application programming interface (API) of a computing device, the operations comprising:
   executing, on a computing device, a first application written in a device-independent programming language;
   providing one or more control objects from the executing first application to a compiler on the computing device, wherein the control objects include state information that defines a context for accessing the native API and the control objects include at least one control script;
   compiling the control script on the computing device to create a second application that is native to the operating system of the computing device; and
   executing the second application on the computing device, wherein the executed second application accesses the native API of the computing device to generate an output through a hardware interface of the computing device based on the context,
   receiving, by the first application, user input; and
   providing, based at least in part on the received user input and from the executing first application to the executing second application, one or more updates to cause the executing second application to accesses the native API of the computing device to generate one or more additional outputs through the hardware interface of the computing device and wherein the one or more updates include one or more updates to the state information in the control objects.

10. The computer program product of claim 9, wherein the second application is compiled as one or more threads that are separate from the first application.

11. The computer program product of claim 9, wherein the second application is compiled as a process that is separate from the first application.

12. The computer program product of claim 9, wherein the first application is executed on a first processor of the computing device, and the second application is executed on a second processor of the computing device that is separate from the first processor.

13. The computer program product of claim 12, wherein the first processor comprises a central processing unit and the second processor comprises a graphics processing unit.

14. The computer program product of claim 9, wherein the first application does not directly access the native API.

15. The computer program product of claim 9, wherein the native API comprises a native rendering API, the hardware interface comprises a display screen, and the second application accesses the native rendering API to render drawing objects on the display screen.

16. The computer program product of claim 9, the operations further comprising receiving one or more updates to the context from the first application and wherein, in response to receiving the updates to the context, the executed second application accesses the native API of the computing device to generate an output through the hardware interface of the computing device based on the updated context.

17. A computing device comprising:
- a hardware interface that outputs information to a user of the computing device;
- a memory storing instructions comprising:
  - a native application programming interface (API) configurable to make an output through the hardware interface of the computing device,
  - a compiler configured to compile control scripts into applications that are native to an operating system of the computing device,
  - a first application written in a device-independent programming language that when executed provides one or more control objects to the compiler, wherein the control objects include state information that defines a context for accessing the native API and the control objects include at least one control script; and
- one or more processors that execute the first application and as a result execute a second application compiled from the control script by the compiler, wherein the executed second application accesses the native API to generate the output through the hardware interface of the computing device, wherein the output is based on the context,
- providing based at least in cart on user input and from the from the executing first application to the executing second application, one or more updates to cause the executing second application to accesses the native API of the computing device to generate one or more additional outputs through the hardware interface of the computing device and wherein the one or more updates include one or more updates to the state information in the control objects.

18. The computing device of claim 16, wherein the hardware interface comprises a display device, the native API comprises a native rendering API, and the output includes one or more drawing objects rendered on the display device.

19. A computing device comprising:
- a hardware interface that outputs information to a user of the computing device;
- a central processing unit;
- a graphics processing unit; and
- means for executing code provided from the central processing unit to the graphics processing unit by passing one or more control objects, including at least one control script, from the central processing unit to the graphics processing unit, by providing updates from a first application executing on the central processing unit to a second application executing on the graphics processing unit that is generated by compiling the at least one control script.

20. The computing device of claim 17, wherein executing the second application comprises causing the second application to communicate with the first application executing on the computing device.

* * * * *

UNITED STATES PATENT AND TRADEMARK OFFICE
CERTIFICATE OF CORRECTION

| | | |
|---|---|---|
| PATENT NO. | : 8,561,038 B1 | Page 1 of 1 |
| APPLICATION NO. | : 12/650803 | |
| DATED | : October 15, 2013 | |
| INVENTOR(S) | : Sams | |

It is certified that error appears in the above-identified patent and that said Letters Patent is hereby corrected as shown below:

In the Claims:

Column 19, line 26, in Claim 17, delete "providing" and insert -- providing, --, therefor.

Column 19, line 26, in Claim 17, delete "cart" and insert -- part --, therefor.

Signed and Sealed this
Twenty-eighth Day of January, 2014

Michelle K. Lee
*Deputy Director of the United States Patent and Trademark Office*